UNITED STATES PATENT OFFICE.

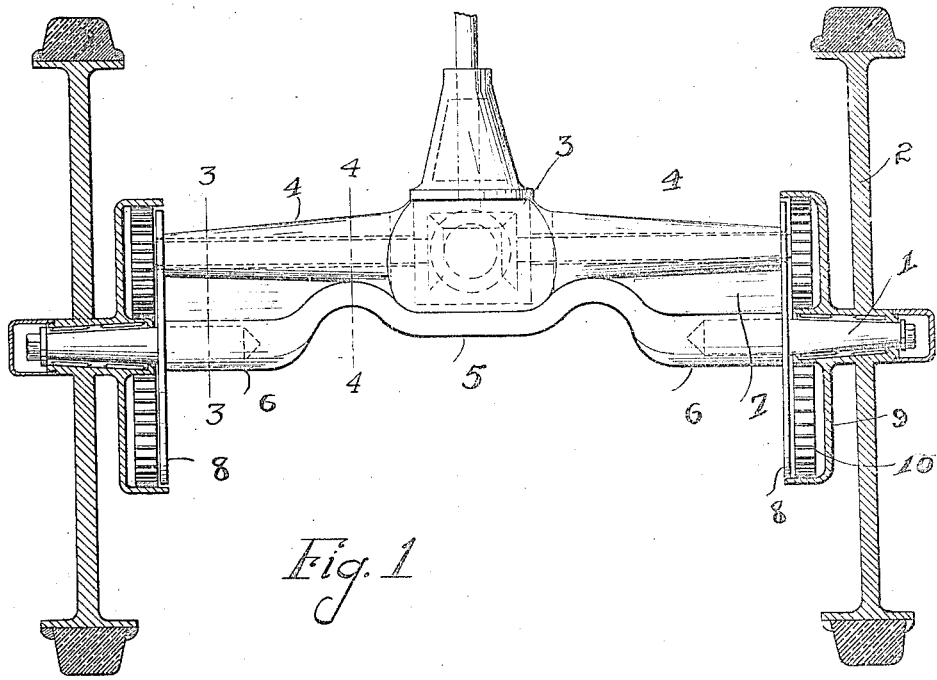
Fig. 1
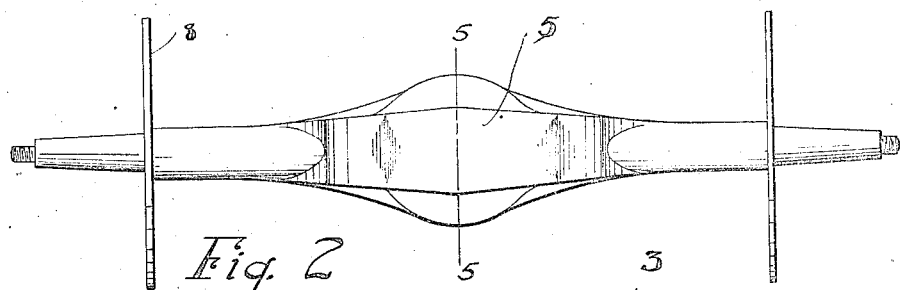
Fig. 2
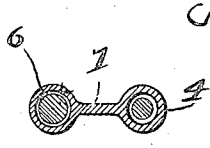  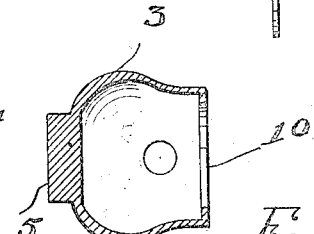
Fig. 3   Fig. 4   Fig. 5

DOUGLAS CAULKINS GOFF, OF KNOXVILLE, TENNESSEE.

AXLE-HOUSING CONSTRUCTION.

1,302,151.   Specification of Letters Patent.   Patented Apr. 29, 1919.

Application filed December 12, 1918. Serial No. 266,448.

*To all whom it may concern:*

Be it known that I, DOUGLAS C. GOFF, a citizen of the United States, and a resident of Knoxville, in the county of Knox and State of Tennessee, have invented certain new and useful Improvements in Axle-Housing Constructions, of which the following is a specification.

My invention is an improvement in axle housing construction, and has for its object to provide a housing of the character specified for a load axle and a live axle in one unit, thus attaining light weight, compactness, strength, simplicity and ease of manufacture.

In the drawings:

Figure 1 is a top plan view of the improved housing;

Fig. 2 is a rear view;

Figs. 3 and 4 are sections on the lines 3—3 and 4—4, respectively, of Fig. 1;

Fig. 5 is a section through the differential housing of the live axle.

In the present embodiment of the invention, the housing consists of a hollow portion for the live axle, and a solid portion for the load axle, the solid portion having sockets or bearings at its ends for receiving the spindles 1 of the wheels, and the spindles are secured within sockets in any suitable or desired manner, each spindle having a portion fitting the socket, as shown.

The housing for the live axle consists of a central portion 3 for the differential, and end portions 4 which taper from the central portion toward their outer ends. The solid portion 5 has the socket 6 at its ends for the spindles, and it will be noticed that the said sockets are spaced a little rearwardly of the outer ends of the tapered portion 4 for the live axle, and the said sockets are connected to the said ends by integral webs 7.

Both the portions 3—4 and 5—6—7 are integral, the whole being an integral structure, and disks 8 are arranged at the ends of the housing, the said disks forming the inner closures for the gear cases 9 which incloses the gearing 10 for connecting the live axle to the spindles.

The construction is a one piece casting, and the portion 3 is open at its front, as shown at 11, to permit the entrance of the transmission shaft and to permit the assembling or disassembling of the differential. With this construction, the load axle and the live axle housing constitute a single unit, the parts being integral with the exception of the axle spindles, which are of steel. The housing is of light weight, but strong, compact, and may be easily manufactured. All of the labor required to assemble drop forged load axles with live axle housings of several sections is dispensed with, and there is a permanent alinement of all shafts, bearings and the like.

I claim:

1. An axle housing construction comprising a solid load axle and a chambered live axle housing integrally connected throughout their length, the load axle having sockets at its ends and steel spindles held in the sockets, the live axle housing consisting of a central portion for housing the transmission, and tapering portions for the axle sections, and a closing plate for the gear housing rigid with the ends of the integral housing.

2. An axle housing construction comprising a solid load axle and a chambered live axle housing integrally connected throughout their length, the load axle having sockets at its ends and steel spindles held in the sockets, the live axle housing consisting of a central portion for housing the transmission and tapering portions for the axle sections.

3. An axle housing construction comprising a solid load axle and a chambered live axle housing integrally connected throughout their length, the load axle having sockets at its ends and steel spindles held in the sockets.

4. An axle housing construction comprising a solid load axle and a chambered live axle housing integrally connected throughout their length, the live axle housing consisting of a central portion for the transmission and tapering portions for the axle sections.

5. An axle housing construction comprising a solid load axle and a chambered live axle housing integrally connected throughout their length.

6. An axle housing construction comprising a load axle and a chambered live axle housing integrally connected throughout their length.

7. An axle housing construction comprising an integrally cast solid load axle and a chambered live axle housing, the ends of the solid load axle being offset laterally from the live axle housing and connected thereto by integral webs.

DOUGLAS CAULKINS GOFF.